United States Patent
Bevc

Patent Number: 6,081,482
Date of Patent: Jun. 27, 2000

[54] SEMI-RECURSIVE IMAGING UNDER COMPLEX VELOCITY STRUCTURES

[75] Inventor: Dimitri Bevc, Lafayette, Calif.

[73] Assignee: 3DGeo Development, Inc., Mountain View, Calif.

[21] Appl. No.: 08/850,972

[22] Filed: May 5, 1997

Related U.S. Application Data

[60] Provisional application No. 60/017,104, May 9, 1996.

[51] Int. Cl.[7] ..................................................... G01V 1/28
[52] U.S. Cl. ................................ 367/57; 367/73; 367/57; 367/56; 367/59; 367/54; 367/36
[58] Field of Search .................................. 367/50, 51, 73, 367/57, 56, 59, 54, 36

[56] References Cited

U.S. PATENT DOCUMENTS

| | | | |
|---|---|---|---|
| H1529 | 5/1996 | Schneider, Jr. | 367/54 |
| 4,577,297 | 3/1986 | Kalkomey et al. | 367/24 |
| 4,887,244 | 12/1989 | Willis et al. | 367/73 |
| 5,394,325 | 2/1995 | Schneider, Jr. | 364/421 |
| 5,502,687 | 3/1996 | Mackay | 367/54 |
| 5,742,560 | 4/1998 | Krebs | 367/50 |

OTHER PUBLICATIONS

Audebert, Francois et al., "Imaging complex geologic structure with single–arrival Kirchhoff prestack depth migration," *Geophysics* 62(5):1533–1543 (1997).

Gray, Samuel H., and May, William P., "Kirchhoff migration using eikonal equation traveltimes," *Geophysics* 59(5):810–817 (1994).

Geoltrain, Sebastien, and Brac, Jean, "Can we image complex structures with first–arrival traveltime?," *Geophysics* 58(4):564–575 (1993).

Berryhill, John R., "Submarine Canyons: Velocity replacement by wave–equation datuming before stack," *Geophysics* 51(8):1572–1579 (1986).

Yilmaz, Oz, and Lucas, Darran, "Prestack layer replacement," *Geophysics* 51(7):1355–1369 (1986).

Berryhill, John R., "Short note: Wave–equation datuming before stack," *Geophysics* 49(11):2064–2066 (1984).

Berryhill, John R., "Wave–equation datuming," *Geophysics* 44(8):1329–1344 (1979).

*Primary Examiner*—Christine Oda
*Assistant Examiner*—Anthony Jolly
*Attorney, Agent, or Firm*—Andrei D. Popovici

[57] ABSTRACT

A computationally efficient semi-recursive Kirchhoff migration algorithm is capable of obtaining accurate images of complex structures in complex geological environments which commonly give rise to multivalued arrivals. The method alternates wave-equation datuming (downward continuation) and Kirchhoff migration. Breaking up the complicated velocity structure into small depth regions allows traveltimes to be calculated in regions where the computation is well behaved and where the computation corresponds to energetic arrivals. Because traveltimes are computed for small depth domains, the effects of multivalued arrivals are implicitly accounted for in the migration and the adverse effects of caustics and headwaves do not develop. The invention can use any simple first-arrival traveltime algorithm, and thus benefits from the computational efficiency, robustness, and simplicity of such algorithms.

26 Claims, 12 Drawing Sheets

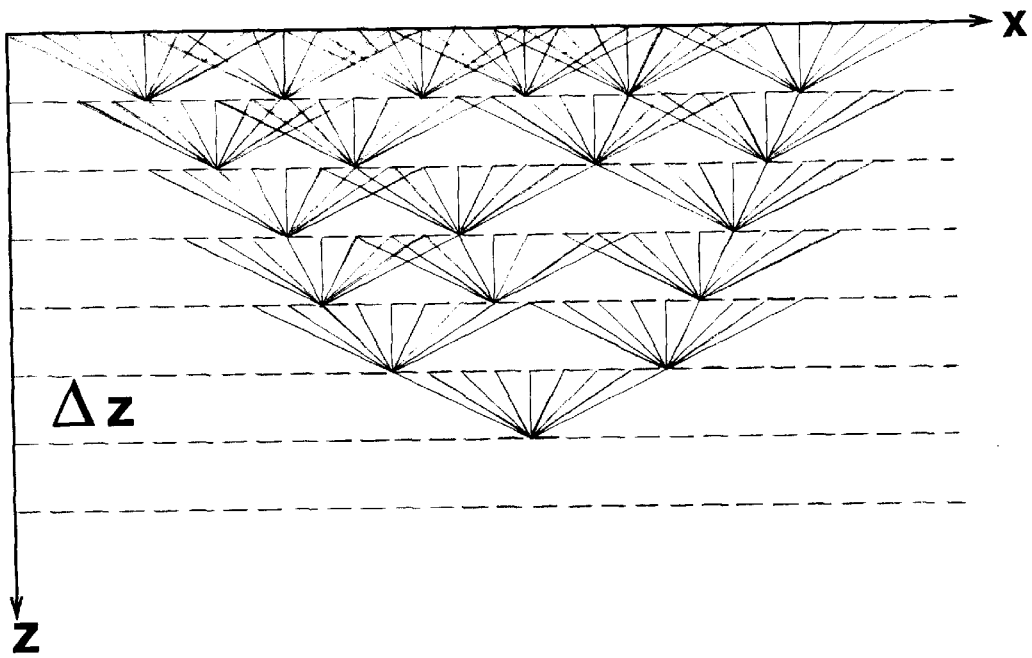
FIG. 3-A
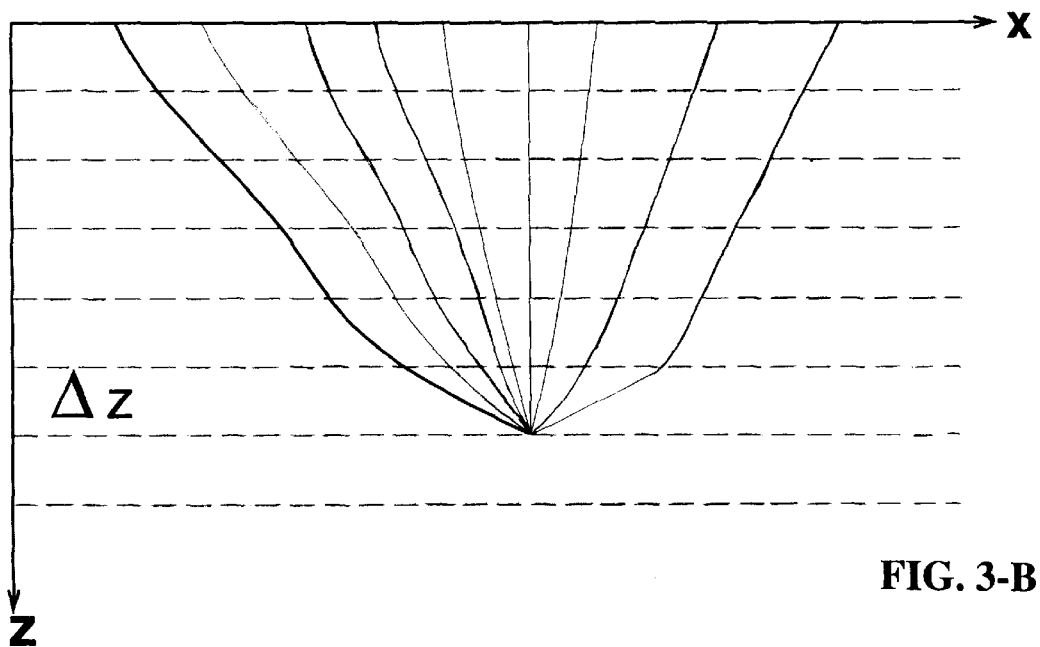
FIG. 3-B

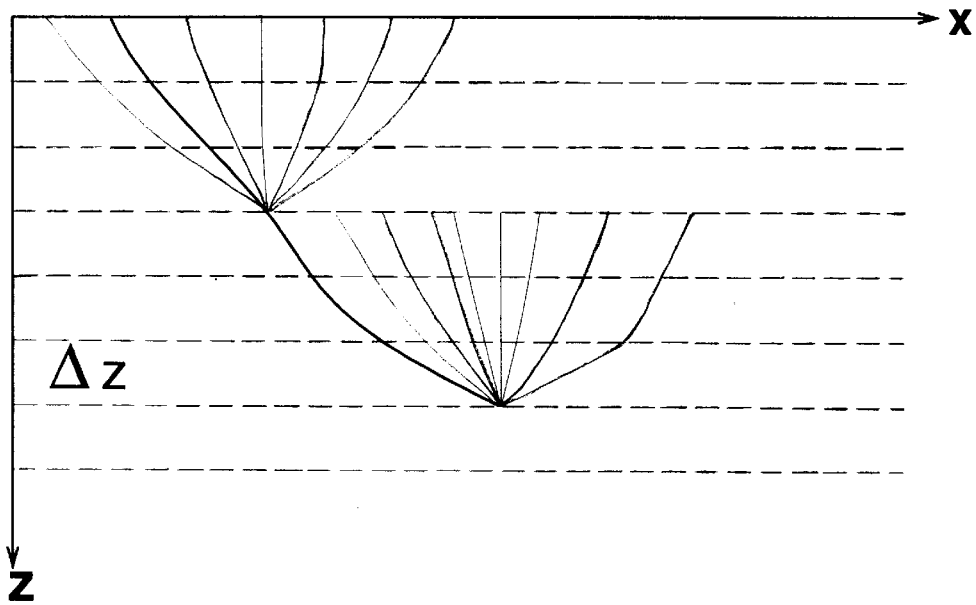
FIG. 3-C
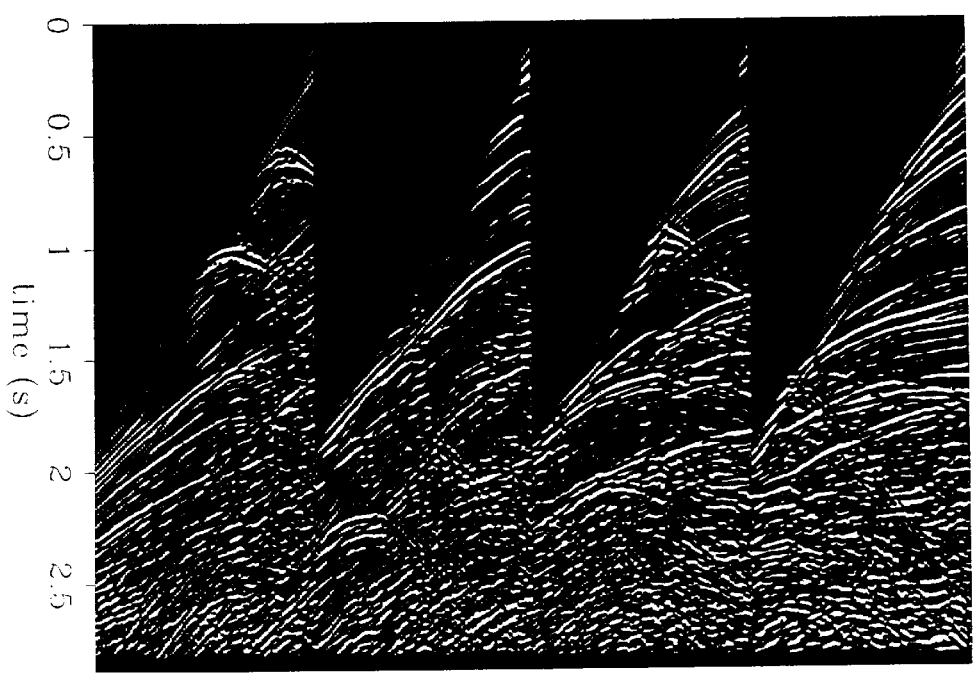
FIG. 5

Fig. 12-A
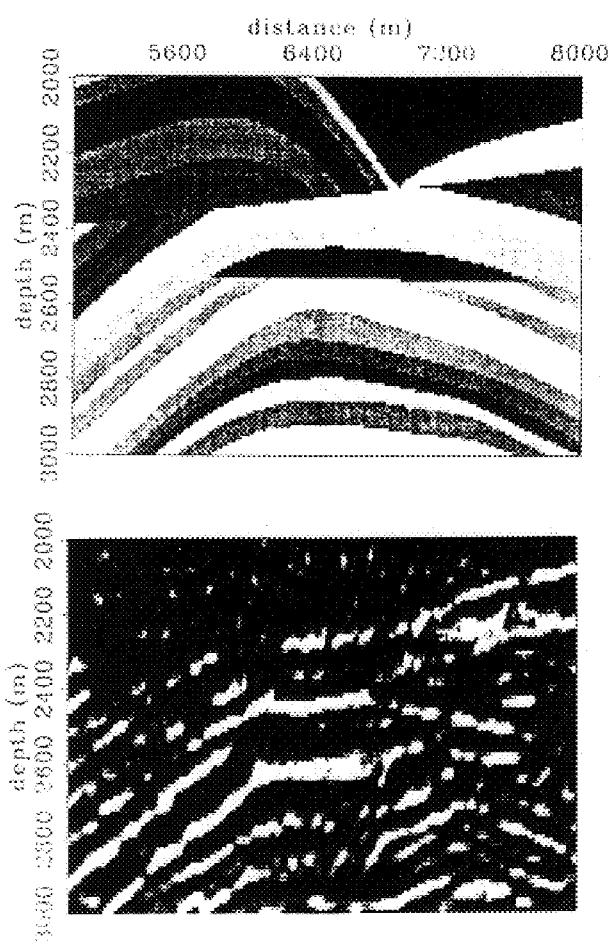
Fig. 12-C
Fig. 12-B
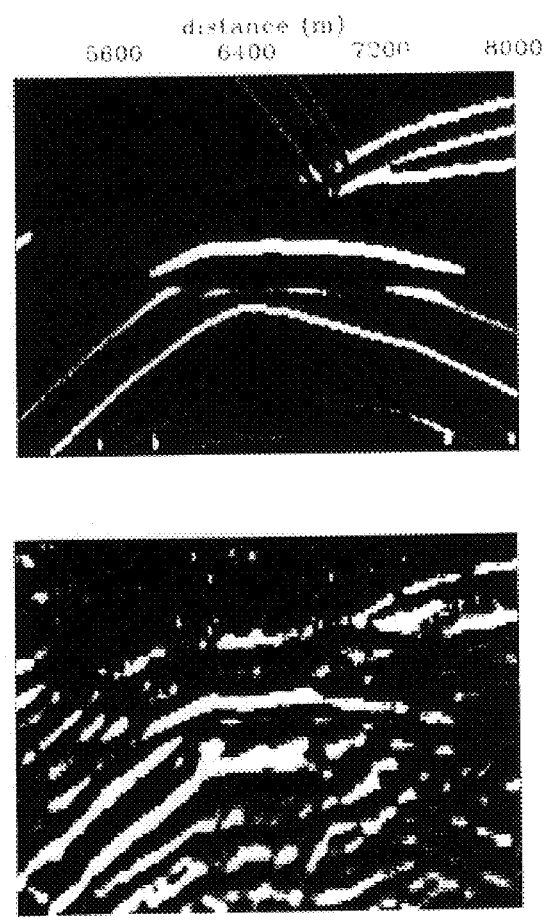
Fig. 12-D

SEMI-RECURSIVE IMAGING UNDER COMPLEX VELOCITY STRUCTURES

RELATED APPLICATION DATA

This application claims the priority date of U.S. Provisional Patent Application No. 60/017,104, filed May 9, 1996, which is herein incorporated by reference.

FIELD OF THE INVENTION

This invention relates to the field of geophysical prospecting using seismic signals, and in particular to a method of imaging deep target regions situated under complex velocity structures by semi-recursive migration.

BACKGROUND OF THE INVENTION

This invention is relevant to seismic data processing in the field of geophysical exploration for petroleum and minerals. The general seismic prospecting method involves the transmission of elastic, or "seismic," waves into the earth and reception of reflected and/or refracted waves at the earth's surface (or, occasionally, in a wellbore) via geophones, hydrophones, or other similar devices (hereinafter referred to collectively as "geophones"). The elastic waves are generated by sources such as dynamite, air guns, and hydraulic vibrators. As these waves propagate downward through the earth, portions of their energy are sent back to the earth's surface by the acts of reflection and refraction which occur whenever abrupt changes in impedance are encountered. Since these impedance changes often coincide with sedimentary layer boundaries, it is possible to image the layers by appropriate processing of the signals returned to geophone groups.

Raw seismic data as they are recorded are not readily interpretable. While they show existence of formation interfaces, raw data do not accurately inform the interpreter as to the location of these interfaces. The process of migration, also called imaging, is well known in the art, and is the repositioning of seismic data so that a more accurate picture of subsurface reflectors is given. In order to perform migration calculations, the seismic velocities of the subsurface at a multitude of points must first be determined or approximated. In the discussions to follow, the unqualified term "velocity" will be used as a short-hand expression that means the velocity of propagation of an acoustic wavefield through earth formations. Generally, for the purposes of this discussion, the term is meant to apply to the propagation of compressional waves although shear waves are not excluded. The term "velocity model" is used to refer to the two- or three-dimensional spatial distribution of velocity. The large-scale velocity model covering the extent of the seismic data acquisition volume is usually a complicated structure with vertically and laterally varying velocity. The commonly used Kirchhoff migration method is well known in the art and requires the calculation of traveltimes through the velocity model. "Traveltime" means generally the amount of time a seismic signal takes to travel from seismic source to a subsurface interface reflection point to a seismic receiver. Current methods of computing traveltimes necessary for two-dimensional and three-dimensional depth migration and associated velocity estimation are inefficient or potentially error-prone when applied to the complicated large-scale velocity models typically encountered.

There are currently two general methods of computing the grid of traveltimes needed to migrate data: the ray tracing methods, and the methods which seek the direct solution of the eikonal equation. As is known to one skilled in the art, the eikonal equation is a form of the wave equation for harmonic waves, valid only where the variation of properties is small within a wavelength, otherwise termed "the high-frequency condition." The eikonal equation relates the gradient of traveltime to the velocity structure.

Seismic ray tracing methods are implemented by solving the ordinary linear differential equations which are derived by applying the method of characteristics to the eikonal equation, a technique known to those skilled in the art. Ray tracing allows the determination of arrival times throughout the subsurface, by following raypaths from a source location, which raypaths obey Snell's law throughout the subsurface volume for which the velocity model is known. Traveltimes along the rays are then interpolated onto a grid of the subsurface. The ray equations may be solved with "shooting" methods or with "bending" methods, both of which are well known to those skilled in the art.

Shooting formulates the ray tracing equations into an initial-value problem, where all ray direction and position components are defined at the source location at time zero. Then equations are recursively solved to trace the rays throughout the medium. Bending formulates the ray tracing equations into a two-point boundary value problem and is based on Fermat's principle, which states that the seismic raypath between two points is that for which the first-order variation of traveltime with respect to all neighboring paths is zero, and attempts to locate a raypath between two points by determining a stationary traveltime path between them. Shooting is generally more efficient computationally than bending; however, both approaches present difficulties and potential inaccuracies when used to compute the gridded traveltime fields required by two- and three-dimensional depth migration. These difficulties and inaccuracies increase with the degree of complexity of the velocity model and with the increase in overall size of the large-scale velocity model. Depth migration typically requires robust grids of traveltimes for high quality images. As used herein, the term "robust" means a process which reliably generates accurate grids of traveltimes regardless of the complexity of the large-scale velocity model.

Complications arise in shooting and bending calculations, especially in large-scale complex velocity models, because each ray is computed independently of all others, and because small changes in the angle of incidence may lead to large changes in ray direction. The latter complication is a manifestation of the nonlinearity of the problem of ray tracing. Thus, with shooting methods, it is difficult to obtain the uniform ray coverage throughout the large-scale model that will admit traveltime interpolation onto a grid. Also, rays may cross, indicating the natural multivaluedness of wave propagation. The multivaluedness of the wave propagation increases in proportion to the complexity and overall size of the velocity model. The multivaluedness of the wavefield complicates the computation because it is desirable to track the multivalued wavefronts, and it complicates the gridding because one may not interpolate between different branches of a multivalued wavefront.

Ray shooting itself is quite efficient, but a robust application using it to compute grids of traveltimes may not be efficient for large-scale velocity models exhibiting complexities which typically give rise to multivalued traveltimes. While the bending method will determine a raypath to any point in the grid, it is subject to local, instead of global, minimization, resulting in traveltime errors in large-scale models. Bending is also inefficient for determining three-dimensional grids of traveltimes.

In large-scale velocity models, crossing ray trajectories and refractions cause complicated amplitude and phase behavior of seismic wavefields. In order to accurately image seismic data, it is necessary to account for these amplitude and phase effects. The calculation of these amplitudes and phase changes along ray trajectories adds significantly to the computational cost of the methods.

Because of their efficiency, methods based on direct solutions of the eikonal equation are particularly attractive for the calculation of migration traveltimes. The calculation is performed by finite-differencing the eikonal equation on either a cartesian grid, or on a polar/spherical grid which is readily interpolated to a Cartesian grid. The traveltimes are piecewise smooth and they fill the computational grid. While methods based on finite-differencing the eikonal equation are efficient and computationally well suited for migration, the solution calculates so called first-arrival traveltimes.

In a large-scale depth model where there are considerable relative changes in velocity, these first-arrival traveltimes often correspond to non-energetic portions of the seismic wavefield. This creates problems for migration since it is critical that the traveltimes used in migration correspond to the energetic portions of the wavefield. Changes in velocity distort the shape of the wave propagation front and create opportunities for frequency components to separate, for headwaves to develop, and for triplications to occur. When high velocity zones are present, the first-arrivals may be non-energetic headwaves. As energy propagates in complicated large-scale models, raypaths tend to eventually cross, which causes phase shifts and triplications. First-arrival traveltimes follow the fastest branch of the triplication bow-tie, which is also the low energy branch. Traveltimes calculated in a large-scale velocity model with a finite-difference method are susceptible to these types of inaccuracies and cannot accurately parameterize the asymptotic Green's functions required for Kirchhoff imaging.

Kirchhoff migration is generally accepted to be the most efficient and practical method of imaging two- and three-dimensional prestack seismic data. However, Kirchhoff algorithms using first-arrival traveltimes typically do a poor job of imaging complex structures, as observed for example by Gray and May, *Geophysics* 59: 810–817 (1993), and Geoltrain and Brac, *Geophysics* 58: 564–575 (1993). Even ray tracing methods which calculate multiple arrivals and most energetic arrivals along with estimates of amplitude and phase do not always result in satisfactory images, as indicated by Audebert et. al., (1995) "Imaging Complex Geologic Structure with Single-Arrival Kirchhoff Prestack Depth Migration," scheduled for publication in *Geophysics* 62, No. 5 (1997).

It is generally accepted that migration methods which use recursive wavefield continuation to backwards propagate the received wavefield produce the best images. These migration methods, commonly referred to as "finite-difference migration" or "phase-shift migration" are well known to those skilled in the art. The problems with recursive finite-difference and phase-shift methods are that they require regular spatial sampling, are computationally intensive, and are not readily applicable to three-dimensional prestack migration. This makes the methods practically applicable only to two-dimensional regularly sampled data, severely limiting their utility. Methods based on the Kirchhoff integral are thus attractive, especially for three-dimensional prestack imaging objectives. Kirchhoff algorithms can easily accommodate irregular sampling and they can be applied in a target-oriented fashion. Using first-arrival traveltimes is popular because they are efficiently computed and they have the attractive property of filling the entire computational grid.

In their 1993 Geophysics article, Geoltrain and Brac ask the question "Can we image complex structures with first-arrival traveltime?" They conclude that they encounter imaging difficulties with Kirchhoff migration using first-arrival traveltimes, and propose to either ray trace to find the most energetic arrivals, or to calculate dynamically correct multiple-arrival Green's functions. Nichols ("Imaging Complex Structures Using Band Limited Green's Functions," Ph.D. Thesis, Stanford University, 1994) calculates band-limited Green's functions to estimate the most energetic arrivals. He estimates not only traveltime, but also amplitude and phase. Both these traveltime calculation methods are computationally complex and much more costly than first-arrival traveltime computation methods.

OBJECTS AND ADVANTAGES OF THE INVENTION

In light of the above, it is a primary object of the present invention to provide a method allowing accurate migration of seismic data using a Kirchhoff method which combines steps of wave-equation datuming with steps of Kirchhoff migration into a semi-recursive migration algorithm capable of using any traveltime calculation method, but particularly well suited to using first arrival traveltimes from solutions of the eikonal equation. It is another object of the present invention to provide an accurate migration method with low computational cost suitable for imaging two- and three-dimensional data in regions of variable velocity and complex geological structure. It is yet another object of this invention to overcome the inaccuracies and errors which arise in the migration of data where traveltimes are calculated in large-scale velocity models by dividing up the large-scale model into smaller velocity models where the traveltime calculation does not suffer from the adverse effects of caustics, triplications, headwaves, ray crossing, phase shifts, multivaluedness, and other propagation phenomena inherent to complex velocity models. These and other objects and advantages will become more apparent after consideration of the ensuing description and the accompanying drawings.

SUMMARY OF THE INVENTION

The present invention provides a computationally efficient method of imaging a deep target region situated underneath a complex velocity structure. Accurately imaging such a deep target region would conventionally require computationally-intensive, recursive methods such as shot-profile migration, and could not be performed using conventional non-recursive, computationally efficient methods such as Kirchhoff migration. In addition, first-arrival traveltimes could not be used to conventionally image such a region, since first-arrival traveltimes computed from the recording surface would not correspond to energetic arrivals. Generally, a deep target region is understood to refer to region for which traveltimes computed from a surface $D[0]$ cannot be accurately used to image the region using a data set $S[0]$ corresponding to $D[0]$. Traveltimes for the deep target region computed from $S[0]$ would be subject to undesirable effects such as headwaves, caustics, multivaluedness, shadow zones, and/or significant ray bending.

In the following discussion, the notation $\{A[j]\}$ is understood to mean a set of $A[j]$ for varying values of $j$, while the notation $A[j]$ is understood to mean an $A[j]$ for some value of $j$.

A method of the present invention comprises establishing a seismic data set $S[0]$, and a subsurface velocity model corresponding to S[0]. The data set S[0] corresponds to a datum D[0], which is preferably an earth surface over which S[0] was recorded. A set of subsurface datums (surfaces) {D[j]}, j=1 . . . J, are chosen within the velocity model such that the set {D[j]} divides the velocity model into a set of J+1 depth regions {R[j−1]}, j=1 . . . J+1. In general, the number J is at least one, and for some applications it is preferred that J>1.

The datums {D[j]} are generally horizontal, and preferably substantially planar. Planar datums are generally suitable for most applications; in applications in which the velocity model comprises a well-defined, sharp velocity interface (such as one defined between salt and sediment), it may be preferable to choose a datum to match the velocity interface, such that traveltime calculations do not cross the interface.

A number of J subsurface data sets {S[j]}, j=1 . . . J, are then generated. Each set S[j] corresponds to a datum D[j], and describes the measurement results of the survey performed on D[0], had the survey been performed on D[j]. Each set S[j] is generated by downward continuing the set S[j−1] to the datum D[j]. After one or more datuming steps performed as described above, a deep target region R[k] is imaged by migrating a data set S[k], wherein 1<k<J. The index j is used to describe data sets used for datuming, while the index k is used to describe data sets from which migration is performed to image deep target regions.

Preferably, the entire set {R[j]} is imaged, and the resulting images are combined to generate a global image of the earth under datum D[0]. At least an upper part of the target region R[k] is imaged by migrating S[k−1], such that near-field distortions in the image of R[k] generated by migrating S[k] are eliminated. That is, the sections imaged from adjacent datums overlap at least slightly. After the determination of a set S[j], the velocity model of the region R[j] is preferably refined by a step of local velocity estimation using S[j].

A surface data set S[0] recorded over a datum D[0] is downward continued (datumed) one or more times to generate a subsurface data set S[k]. A first set of traveltimes suitable for datuming the data set S[0] are determined using a subsurface velocity model corresponding to S[0]. A second set of traveltimes for the data set S[k] is then determined from a subsurface velocity model of a deep target region situated under a datum D[k] corresponding to the data set S[k]. The second set of traveltimes is suitable for accurately imaging the deep target region using the data set S[k]. The datum D[k] is preferably under a complex velocity structure, such that datuming to D[k] eliminates the undesirable effects of the complex velocity structure on subsequent calculations. The deep target region is imaged by migrating the data set S[k] using the set of traveltimes.

The traveltimes are preferably first arrival traveltimes corresponding to most energetic arrivals. The traveltimes are preferably determined by applying a finite-difference solution of the eikonal equation to the subsurface velocity model. Downward continuation steps Δz are chosen to be small enough that first arrival traveltimes computed for the depth steps correspond substantially to most energetic arrivals. The steps Δz are on the order of a seismic wavelength, typically on the order of hundreds of meters. The steps Δz are much larger than the steps used in recursive imaging methods such as shot-profile migration. The datum D[k] corresponding to the data set S[k] is preferably a substantially planar surface, typically situated at least 1000 m deeper than the datum D[0] corresponding to the data set S[0]. The downward continuation of the data sets is preferably a Kirchoff downward continuation. The migration of the data sets is preferably a Kirchhoff migration.

The present invention further comprises a system for imaging the deep target region. The system comprises a datuming means, a traveltime determination means, and an imaging means. The datuming means generates S[k] by downward continuing S[0] (in one or more steps). The traveltime determination means determines a set of traveltimes for S[k], suitable for imaging the deep target region. The imaging means images the deep target region by migrating S[k] using the set of traveltimes computed by the traveltime determination means.

DESCRIPTION OF THE FIGURES

FIG. 3-A is a schematic of propagation paths from the surface to an image point for recursive finite-difference migration.

FIG. 3-B is a schematic of propagation paths from the surface to an image point for Kirchhoff migration.

FIG. 3-C is a schematic of propagation paths from the surface to an image point for the semi-recursive migration of the present invention.

FIG. 5 shows some shot gathers from the Marmousi data set.

FIG. 12-A is a view of the velocity model of a deep target region of the Marmousi data set.

FIG. 12-B is a view of the ideal reflectivity of the region of FIG. 12-A.

FIG. 12-C shows an image of the region of FIG. 12-A, generated after a single datuming step according to the present invention.

FIG. 12-D shows an image of the region of FIG. 12-A, generated after multiple datuming steps according to the present invention.

DETAILED DESCRIPTION

Figure 1:
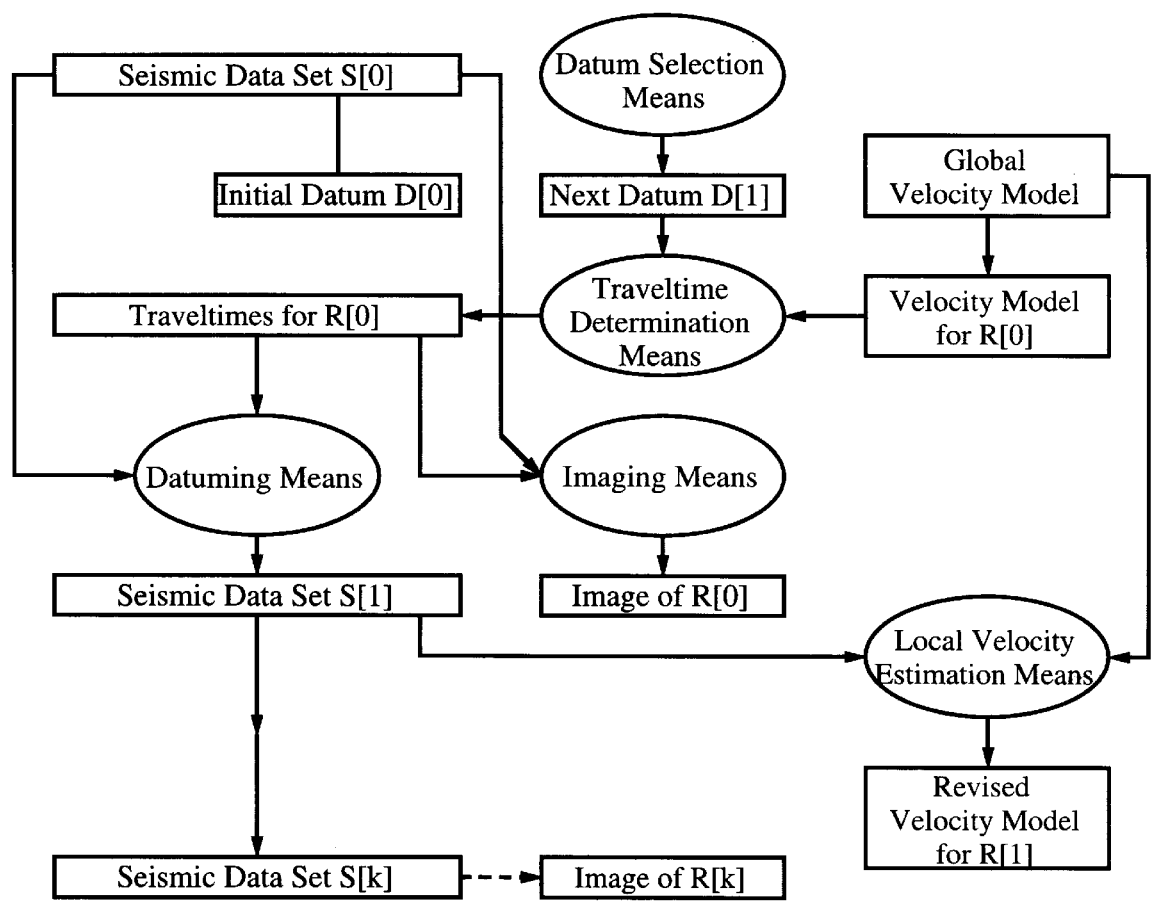
FIG. 1 is a flow chart illustrating the method of this invention.
Figure 2:
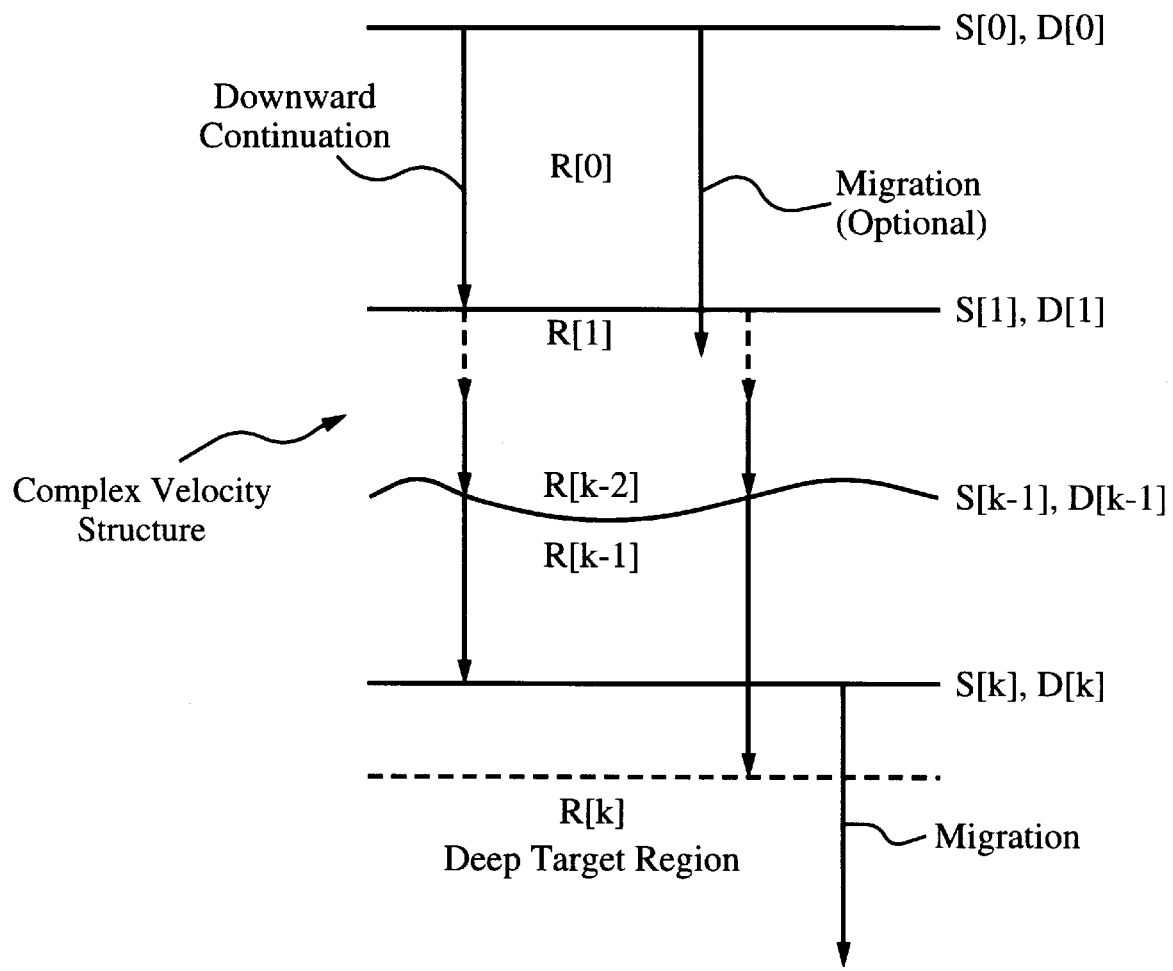
FIG. 2 is a schematic diagram depicting geometrical relationships of surfaces referenced in FIG. 1.

FIG. 1 outlines the processing steps in a preferred embodiment of the present invention, while FIG. 2 illustrates geometric relationships between surfaces within the earth and processing steps relating to the surfaces. The method is used to generate an image of a complex velocity structure under a datum D[0], and in particular an image of a deep target region situated under the complex velocity structure, deep under datum D[0].

A seismic data set S[0] corresponding to datum D[0] is obtained by any of a number of conventional methods well known in the art. Datum D[0] is a surface over which set S[0] was recorded, and is typically a planar surface (e.g. the earth surface). A global velocity model of the earth structure under D[0] is generated by methods readily available to the skilled artisan. A datuming means chooses a subsurface datum D[1] at a distance $\Delta z$ under datum D[0]. In principle, datum D[1] may be any generally horizontal surface. Datum D[1] is preferably a planar surface. Alternatively, datum D[1] consists essentially of a velocity interface defined by the velocity model. For certain complex velocity models, choosing the datum to correspond to a velocity interface could be advantageous because the traveltime calculation would not be subject to adverse propagation effects resulting from the calculation crossing the interface. A depth region R[0] is defined between datum D[0] and datum D[1].

The distance $\Delta z$ is chosen to be short enough that the traveltimes between D[1] and D[0] correspond to energetic (preferably, most energetic) arrivals, such that traveltime calculations are not subject to multivaluedness, caustics, headwaves, and other adverse propagation effects. Then, the traveltimes accurately parameterize the acoustic wavefield, and the traveltime propagation front matches the wave equation front. The distance $\Delta z$ is preferably chosen to be much higher than the depth steps typically used in shot-profile migration.

Using a velocity model for region R[0], a traveltime determination means determines a set of traveltimes for region R[0]. Various ways of determining traveltimes are suitable for a method of the present invention, including energetic ray tracing or band-limited traveltime calculation methods. The quality of the final image depends on the traveltime calculation.

An important advantage of an imaging method of the present invention is that it does not require computationally-intensive traveltime calculations. Therefore, the computed traveltimes are preferably first arrival traveltimes determined by a finite-difference solution to the eikonal equation in region R[0]. For information on computing traveltimes using a finite-difference solution of the eikonal equation, see for example U.S. Pat. No. 5,394,325 by Schneider, herein incorporated by reference. Other methods of calculating first-arrival traveltimes are well known in the art.

Using the traveltimes for R[0], a datuming means generates a subsurface data set S[1] by downward continuing the data set S[0] to the datum D[1]. Downward continuation (datuming) methods are well known in the art, and include Kirchhoff, phaseshift, and finite-difference datuming. Preferably, set S[1] is generated by a Kirchoff downward continuation of set S[0], since Kirchhoff datuming is relatively efficient and lends itself well to 3-D applications. For information on wave-equation datuming see the articles by Berryhill in *Geophysics* 44:1329–1344 (1979), and 49:2064–2067 (1984).

Datuming has been used previously for a number of applications. In U.S. Pat. No. 4,887,244, Willis et al. describe the use of datuming for interpolating additional traces between existing traces. Willis et al. do not discuss or suggest the use of datuming to improve traveltime calculations for imaging a deep target region.

In U.S. Pat. No. 4,577,297, Kalkomey et al. describe a marine seismic exploration method involving datuming for replacing the seismic energy velocity in a water layer with a velocity matching that of the earth medium below the water layer. Data gathered at the water surface is downward continued to the water bottom using the water velocity, and upward continued to the surface using the earth velocity. The method is intended to remove the distortions produced by the sharp velocity interface between the water and earth layers, and does not teach or suggest the use of datuming for imaging deep target regions under complex velocity structures. For additional information on the use of datuming in marine geophysical exploration applications, see for example the articles by Berryhill in *Geophysics* 51:1572–1579 (1986), and Yilmaz and Lucas in *Geophysics* 51:1355–1369 (1986).

In U.S. Statutory Invention Registration No. H1529, Schneider et al. describe a method using datuming to remove the non-hyperbolic distortions of traces introduced by the uppermost layer of the earth, also called the low-velocity-layer. The method is similar to that disclosed by Kalkomey et al. Schneider does not discribe accurately imaging deep target regions under complex velocity structures.

In U.S. Pat. No. 5,502,687, Mackay describes a method of processing geophysical data recorded over irregular topography. A datum is established above the recording surface, and the recorded data are time-shifted from the recording surface to the datum using a replacement velocity that is an extrapolation of the underlying earth velocity. Similarly to the prior art patents describe above, the method described by Mackay is intended to address the effects of near-surface undesirable features, and not of complex velocity structures.

The douve prior art applications of datuming use layer-replacement to eliminate the deleterious effects of irregular recording surface topographies (e.g. in mountain surveys), or of sharp velocity interfaces situated closely under the recording surface (e.g. in marine surveys). The prior art uses of datuming are directed to eliminating undesirable effects generated by structural features near the recording surface. None of the prior art references teaches or suggests the use of layer-stripping for improving the accuracy of traveltime computations for deep target regions in complex structures.

The datum selection means selects a second datum D[2] under D[1], and the process described above is repeated for the region R[1] defined between D[1] and D[2]. Preferably, a local velocity estimation means refines portion of the global velocity model within R[1], to remove the complicated effects of the velocity structure of R[0] on the initial computation (from D[0]) of the velocity model of R[1]. A more refined velocity model for R[1] allows the use of a simple algorithm for imaging R[1]. Care should be taken to make sure that the velocity of the overlying layer R[0] is accurately determined, because any error in the datuming velocity affects the gathers resynthesized at D[1]. Even if the velocity structure of R[0] is only moderately complicated, it can be advantageous to perform velocity estimation for R[1] from D[1] rather than D[0].

If desired, an image of region R[0] is generated by migrating the data set S[0] to datum D[1] or below. Various suitable migration methods are well known in the art. The migration step uses the traveltimes computed for R[0]. Preferably, the migration is Kirchoff migration. In general, the downward continuation process described above is repeated for a number of datums $\{D[j]\}$, $j=1 \ldots J$. Regions $\{R[k]\}$ are imaged by migrating data sets $\{S[k]\}$, wherein $1 \leq k < J$. Preferably, the migration from a datum D[k] is performed to a surface below D[k+1]. Then, an upper part of R[k+1] is imaged not only by migrating S[k+1], but also by migrating S[k]. The image generated by migrating S[k] is used for eliminating the near-field distortion in the image of the upper part of R[k+1] generated by migrating S[k+1].

The above process is preferably repeated for all j and at least some k less than the maximum value J. For k=J (the lowermost datum), only a migration step is performed (and not datuming). The last migration step is generally less sensitive than prior migration steps, and could in general be performed by time-migration rather than depth migration.

A semi-recursive algorithm of the present invention is capable of obtaining accurate images of complex structures by combining wave-equation datuming and Kirchhoff migration. The method is successful because breaking up the complex velocity structure into small depth regions allows traveltimes to be calculated in regions where the computation is well behaved and where the computation corresponds to energetic arrivals. The traveltimes computed in such a region are used for imaging, and for downward continuation of the entire survey (shots and receivers) to the boundary of the next region. This process results in improved images at reduced computational cost. Because traveltimes are computed for small depth domains, the adverse effects of multivaluedness, caustics, headwaves, and other adverse propagation effects do not develop. This method requires only the same number of traveltime calculations as a standard Kirchhoff migration which uses only one set of traveltimes calculated from the surface. The process has the advantage of being able to use any simple first-arrival traveltime algorithm, thus benefiting from the computational efficiency, robustness, and simplicity of such methods.

The premise of the semi-recursive method is that data can be re-synthesized at any subsurface datum by downward continuation with a Kirchhoff datuming algorithm. The depth step of the datuming is limited so that the first-arrival traveltimes are calculated in such a way that they accurately parameterize the most energetic portions of the wavefield. In this way, the downward continued data are accurately synthesized at a datum which is closer to the imaging target. Traveltimes are then calculated from the new datum, and the data can either be downward continued again or migrated from the new datum. Since all the traveltimes in this process are calculated over a smaller portion of the velocity model, the final outcome is a more accurate image.

The semi-recursive datuming/migration method can be thought of as a hybrid algorithm that incorporates some of the advantages of recursive migration with the efficiency of Kirchhoff migration. It is termed "semi-recursive" because the datuming depth step is much greater than the depth step used in phase-shift or finite-difference migration. Because the data are re-synthesized at one or more depth levels in the subsurface, the method has the added advantage of implicitly handling multivalued arrivals. In each datuming and imaging step the traveltime tables are single valued, but because the data are repropagated at every step, the semi-recursive method captures the same energy that is accounted for by using multivalued traveltime tables.

This is illustrated in FIGS. 3-A through 3-C by comparing recursive migration to standard Kirchhoff migration, and to the semi-recursive method. In a recursive method such as finite-difference migration, shots and geophones are alternately downward continued through each depth level. The figures illustrate a few representative propagation paths from the surface to an image point for one line of shots or geophones.

In shot-profile migration, illustrated in FIG. 3-A, there are many propagation paths from the surface to the image point, therefore multivalued arrivals are handled. The computation is performed for all frequencies. By contrast, first-arrival Kirchhoff migration is performed by summing data over trajectories defined by the propagation paths illustrated in FIG. 3-B. There is only one path linking each surface position to the image point, therefore multivalued arrivals are not handled. Although crossing paths are not illustrated here, they can occur.

The semi-recursive (layer-stripping) method is illustrated in FIG. 3-C. It is a combination of Kirchhoff wave-equation datuming and Kirchhoff migration. There are multiple propagation paths from the surface to the image point; therefore, multivalued arrivals are handled. The depth step of Kirchhoff downward continuation is much larger than the $\Delta z$ used in shot-profile migration. Since there are multiple paths from the surface to the image point, multiple arrivals are handled. Because the paths are shorter than in FIG. 3-B, first-arrival traveltimes are more likely to be valid.

The present invention not only produces improved images as compared to prior art methods, but also has advantages in computational cost and memory requirements. Since traveltimes for 3-D imaging are often calculated in spherical coordinates, for a given cube of desired traveltimes, the traveltime calculation requires a spherical volume with a radius equal to the longest cube diagonal. Therefore, if the velocity model is subdivided, the number of traveltimes that need to be calculated is dramatically reduced. The reduced volume also significantly reduces the storage space required during the calculation. Moreover, after each depth step, the resynthesized data traces get progressively shorter, and consequently the datuming computation and the amount of storage per trace is reduced after each depth step.

For standard non-recursive Kirchhoff migration, the migration aperture increases with depth. Computational cost increases linearly with aperture. In the semi-recursive method, after each datuming depth step, both the migration and datuming aperture can be reduced. This not only cuts down on the number of calculations, but it can be used to limit the amount of input data kept in memory for any given output location. A key algorithmic difference between migration and wave-equation datuming is that in datuming each input trace is shifted statically rather than dynamically. Consequently, computations can be performed quickly and efficiently as complex multiplications in the frequency domain.

The following examples are intended to illustrate the invention, and should not be construed to limit the invention.

EXAMPLE 1

Figure 4:
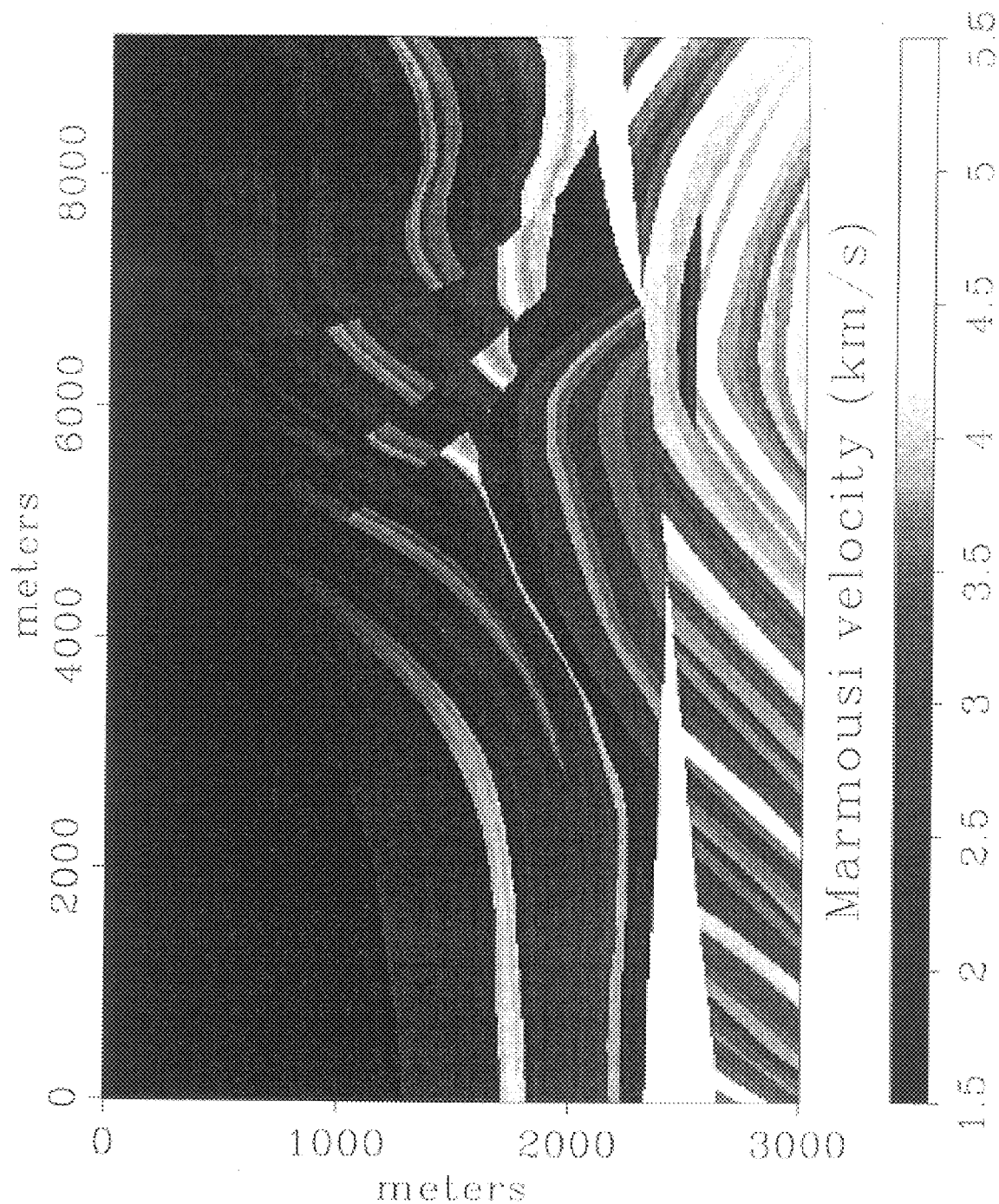
FIG. 4 shows a velocity model of the Marmousi data set.

The Marmousi synthetic data set (Bourgeois et. al., Proceedings of the 1990 EAEG Workshop on Practical Aspects of Data Inversion: Eur. Assoc. Expl. Geophys., 5–16, 1991) was first released as a blind test for velocity estimation. When the velocity model was revealed, however, it was discovered that many migration algorithms produced poor results, so the data set has become a popular testbed for migration algorithms. It is a complicated acoustic 2-D data set based on the geology of the Cuanza basin in Angola. The velocity model is shown in FIG. 4. The structural style is dominated by growth faults which arise from salt creep and cause the complicated velocity structure in the upper part of the model. The main imaging objective is the reservoir in the anticlinal structure below the salt.

The synthetic data set consists of 240 shots with 96 gathers each. The representative shot gathers in FIG. 5 display complicated nonhyperbolic moveout, clearly indicating that this is a depth imaging problem. Zero-phase source deconvolution was applied to the data used in this study as part of the preprocessing, as described in the article by Barut et al. in Proceedings of the 1990 EAEG Workshop on Practical Aspects of Data Inversion: Eur. Assoc. Expl. Geophys., 159–167, 1991.

Figure 6:
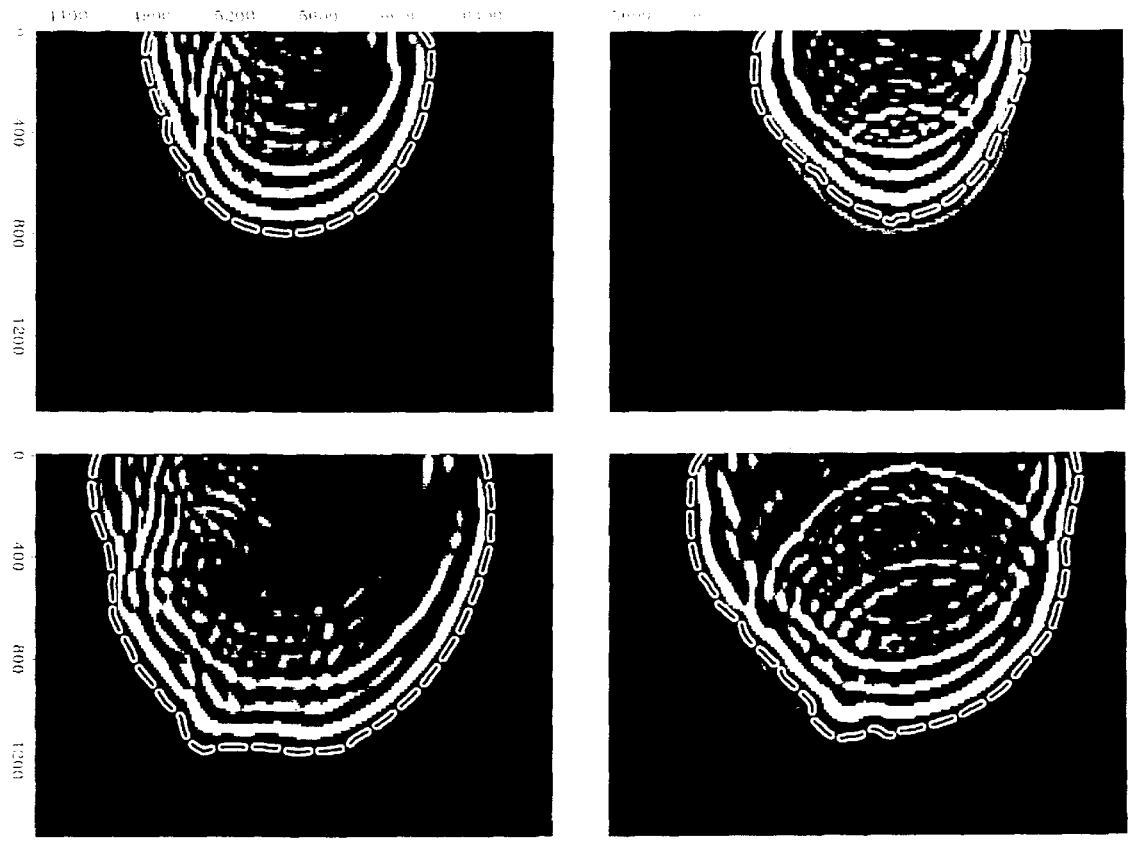
FIG. 6 is an early-time view of acoustic wavefield modeling overlaid by contours of traveltime.
Figure 7:
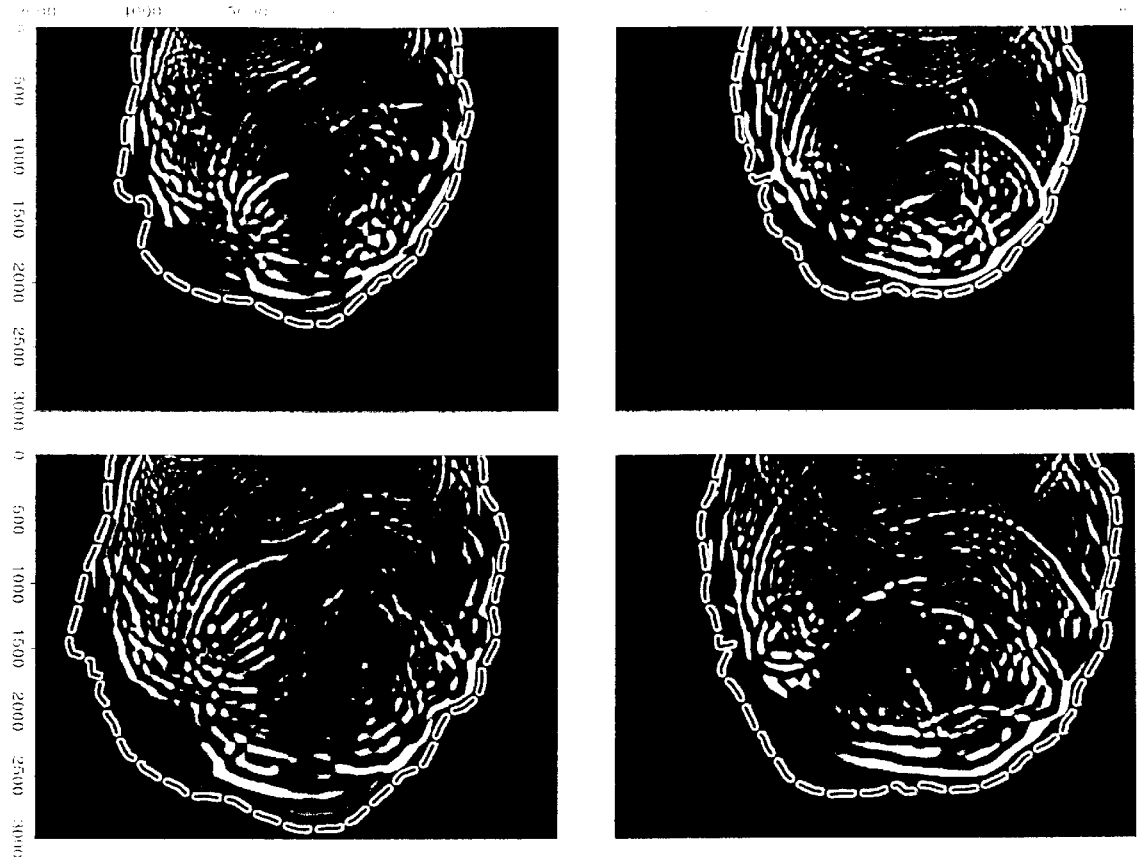
FIG. 7 is a late-time view of acoustic wavefield modeling overlaid by contours of traveltime.
Figure 8:
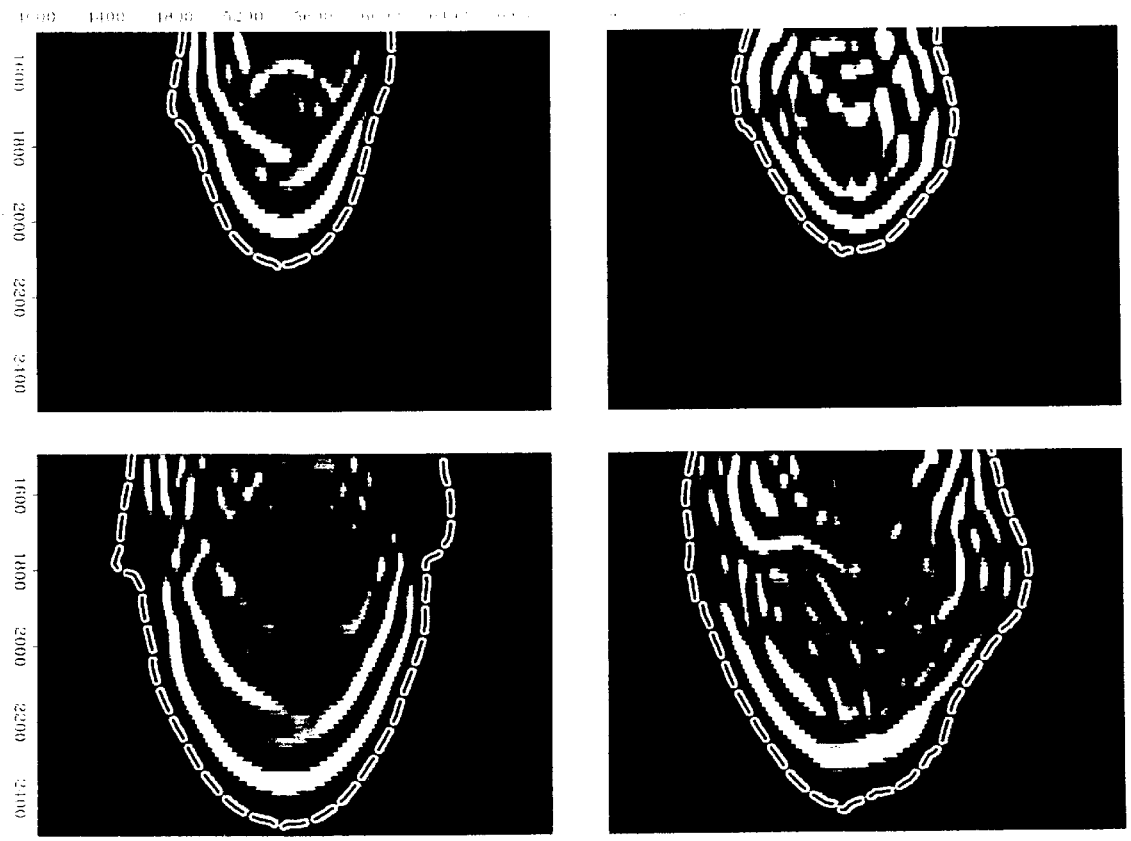
FIG. 8 is a source-at-depth view of acoustic wavefield modeling overlaid by contours of traveltime.

The Marmousi velocity model generates complex propagation paths in which late energetic arrivals are not fit well by first-arrival finite-difference traveltimes. In FIGS. 6–8, a modeling program is used to generate snapshots of the acoustic wavefield from two surface locations in the Marmousi model. The corresponding contours of first-arrival traveltime have been overlaid. These contours are from the first-arrival traveltime tables used for Kirchhoff datuming and migration.

The top two snapshots in FIG. 6 are at 0.4 s, while the bottom two snapshots are at 0.55 s. The left snapshots are at a surface location of 5425 m, while the right snapshots are at a surface location of 6887.5 m in the Marmousi model. At the early-time snapshots displayed in FIG. 6, the first-arrival contours overlay the energetic portions of the wavefield nicely. This is because there has not been enough time for adverse propagation effects to fully develop. Since the first-arrival traveltime matches the high energy portions of the wavefield, using these traveltimes for Kirchhoff migration will result in good imaging at these early times.

By contrast, snapshots for the same source locations at later times of 0.9 s and 1.05 s (top and bottom of FIG. 7, respectively) show that the first-arrival traveltimes do not always correspond to energetic portions of the wavefield. If these traveltimes were used for migration, the resulting image would suffer because parts of the summation trajectories would not correspond to energetic arrivals. This last sequence of two figures demonstrates that as the wavefield evolves, complex propagation effects begin to manifest themselves, and the first-arrival traveltimes no longer match the most energetic wavefront.

FIG. 8 is generated by starting the acoustic modeling and the first-arrival traveltime calculation from a depth of 1500 m. The 0.2 s (top snapshots) and 0.3 s (bottom snapshots) contours correspond nicely to the high energy portions of the wavefields. There is some deviation in the shallow part of the lower left 0.3 s panel, but for the most part the first-arrival traveltime contour fits the bulk of the acoustic energy very well. The pulling away of the first-arrival traveltime contour represents a headwave propagating along the thin high velocity layer that starts under the fault at lateral position of about 5500 m and depth of 1500 m in FIG. 4.

Overall, the contours in FIGS. 6 and 8 have not pulled away from the energetic wavefront as have those in FIG. 7. This shows that if traveltime calculation is limited to early times, the first-arrival traveltimes accurately parameterize the most energetic portions of the acoustic wavefield.

Figure 9:
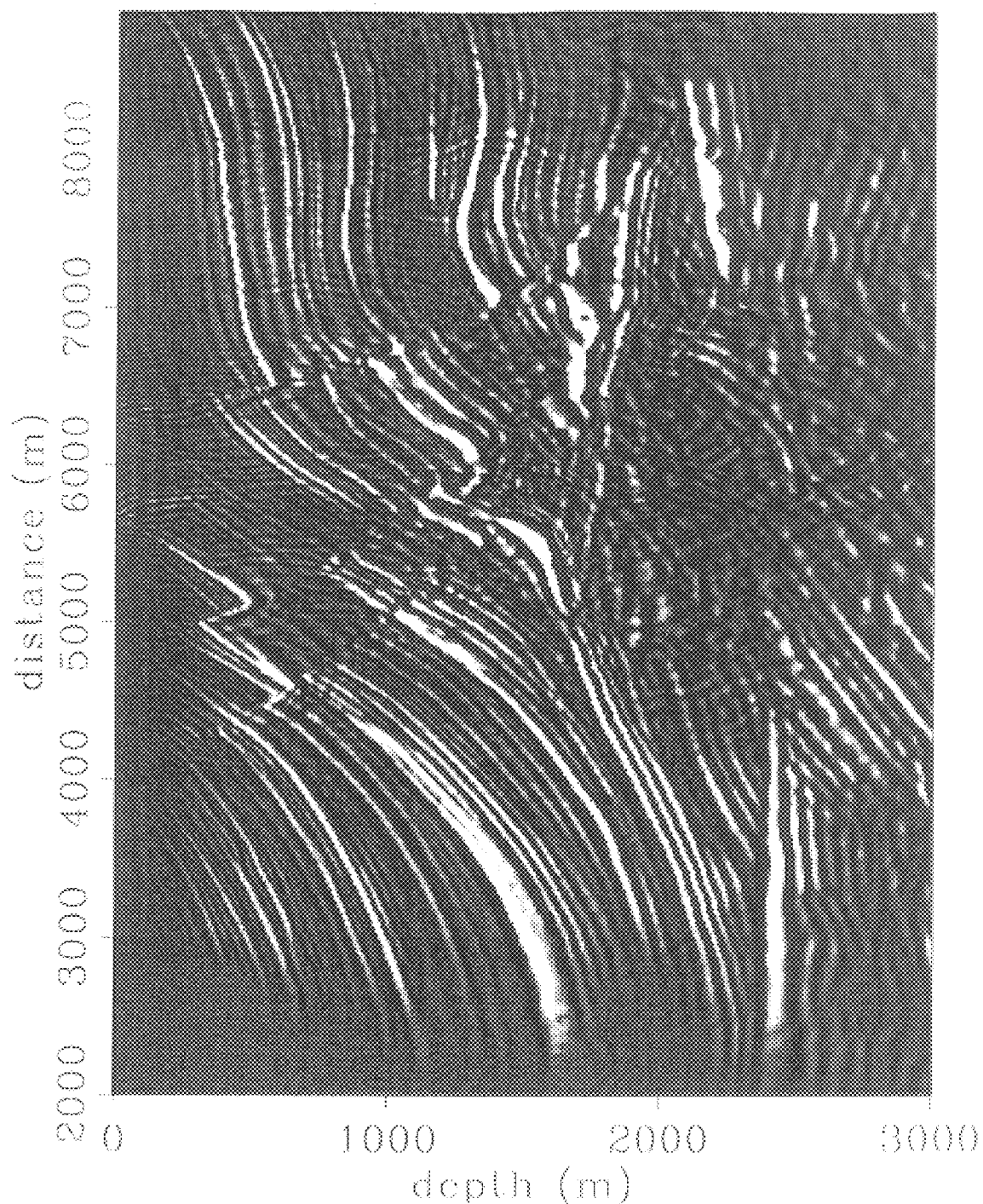
FIG. 9 is a view of the Marmousi data set migrated using standard Kirchhoff migration.

FIG. 9 is the result of standard Kirchhoff migration of the Marmousi synthetic using first-arrival traveltimes calculated with a finite-difference eikonal equation solver. The faults and beds in the upper portion are well imaged; however, the anticlinal structure below 2300 m and the target zone at a lateral position of about 6500 m and depth of 2500 m are not well imaged.

The migration result corresponds exactly to the observations made in comparing the acoustic wavefield modeling to contours of first-arrival traveltime. The upper 1500 m to 2000 m of the migration which is well imaged corresponds to the wavefields and contours of FIG. 6. In this part of the model, the first-arrival traveltimes accurately parameterize the high energy portion of the wavefield. The left and right sides of the figure are nicely imaged because the velocity model is relatively simple in these areas. The central portion of the image, at the target zone, corresponds to the wavefields and traveltime contours of FIG. 7. The propagation here is complicated by the overlying faults which contain fast and slow velocity regions, and by the high velocity salt which partially overlays the target.

EXAMPLE 2

Figure 10:
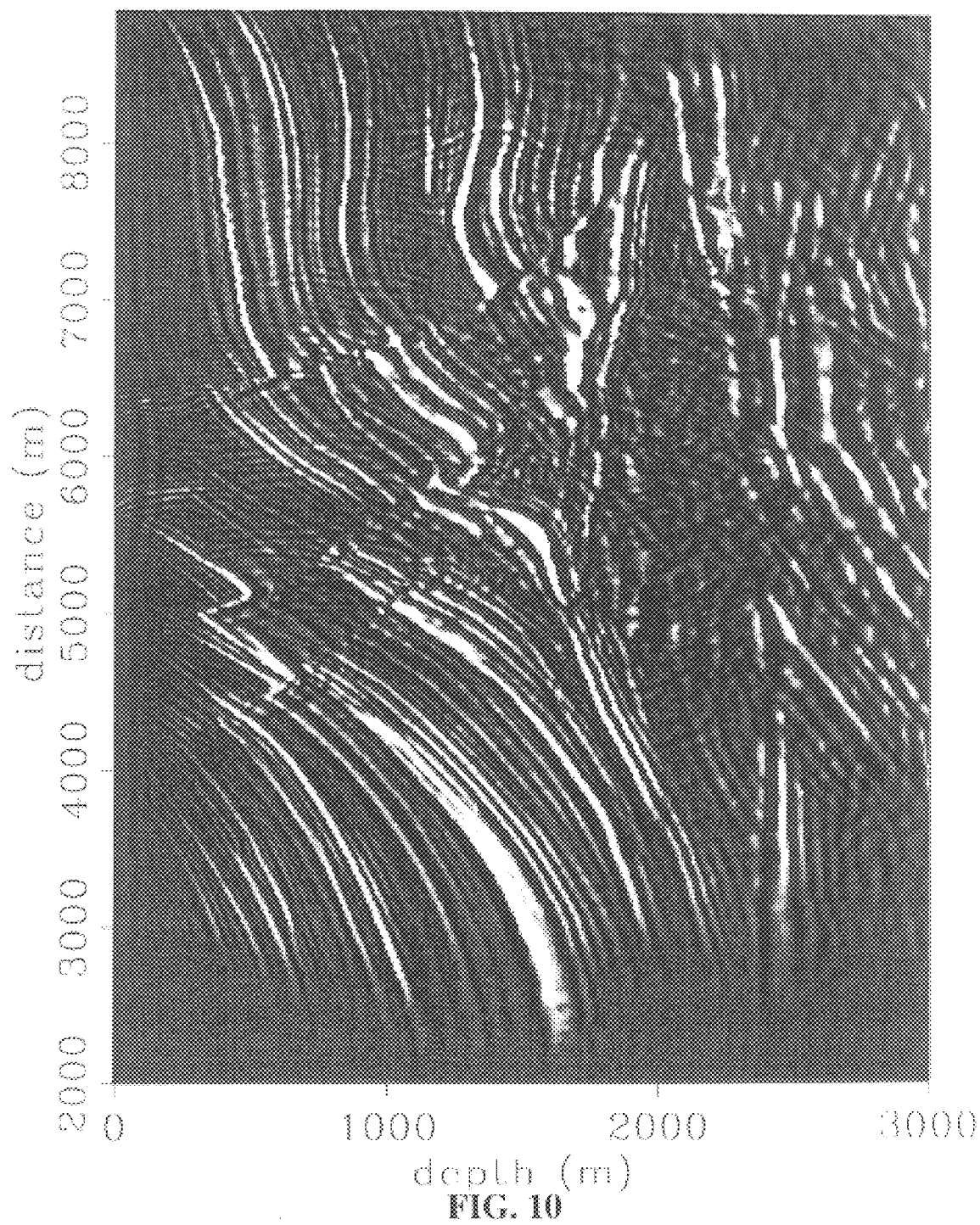
FIG. 10 is a view of the Marmousi data set migrated using a single large datuming step, according to the present invention.

The result of applying the semi-recursive algorithm to the Marmousi synthetic data set is displayed in FIG. 10. It is generated by downward continuing the data to a depth of 1500 m in one datuming step. The downward continued data are then migrated and combined with the previous image of the upper 2000 m. This overlap is used to preserve image quality because the portion of the image directly below the 1500 m datum suffers from the effects of limited offset and near-field Kirchhoff distortion. The overlap simply avoids the near-surface distortion suffered by most Kirchhoff migration algorithms.

FIG. 10 shows a clear improvement over the standard migration displayed in FIG. 9. The anticlinal structure below the salt and the target are now clearly imaged.

Figure 11:
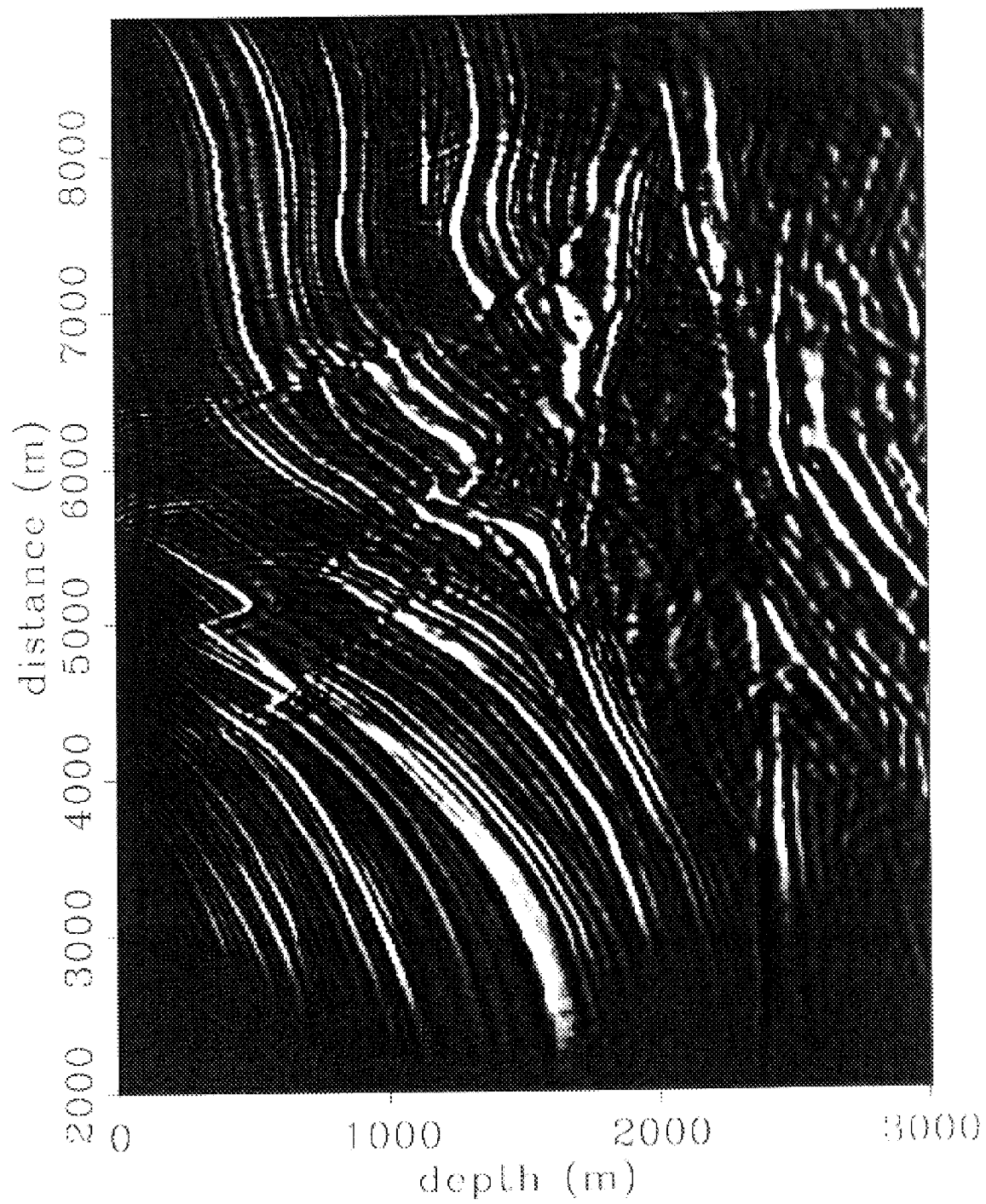
FIG. 11 is a view of the Marmousi data set migrated using multiple datuming steps, according to the present invention.

An even greater imaging improvement is attained by making the datuming step shorter since this insures that the first-arrival traveltimes are a better approximation to the most energetic arrivals. Continuing the data to 1500 m in three steps of 500 m each, results in an even better focused image of the anticline and the target (FIG. 11). In both FIG. 10 and FIG. 11, events which unconformably define the top of the anticline, the anticline events themselves, and the target events, are clearly imaged. The lateral continuity and event coherency in the target zone are substantially improved in FIG. 11.

In FIGS. 12-A through 12-D, the images in the vicinity of the target zone are compared to the velocity model and a synthetic reflectivity model which represents the desired image. The synthetic reflectivity (FIG. 12-B) is obtained by combining the velocity and density models and convolving with a wavelet. This type of resolution cannot be expected from migration, but ideally, the migration results should provide a comparable structural image.

Both of the layer-stripping images in FIG. 12-C and FIG. 12-D compare favorably with the desired reflectivity. The image obtained by downward continuing the data in three steps of 500 m is superior since the events display better lateral continuity and the image is clearer. This is because the traveltimes calculated for each of the 500 m steps are better behaved than the traveltimes calculated for one step of 1500 m. The resolution is so good that the flat spot in the reservoir and the strongly reflective cap stand out clearly. The phase of the events is a good match to that of the synthetic reflectivity section.

A comparison of a semi-recursive migration algorithm of the present invention to finite-difference shot-profile migration, and Kirchhoff migration using both maximum amplitude traveltimes and band-limited Green's functions reveals that the semi-recursive migration produces the best image: it is the best match to the idealized reflectivity and it has the best overall image quality in terms of lateral continuity and structural definition.

It will be clear to one skilled in the art that the above embodiments may be altered in many ways without departing from the scope of the invention. Accordingly, the scope of the invention should be determined by the following claims and their legal equivalents.

What is claimed is:

1. A method of imaging a deep target region situated under a complex velocity structure, comprising:
   a) downward continuing a data set S[0] for generating a subsurface data set S[k] corresponding to a generally horizontal subsurface datum D[k];
   b) determining a set of traveltimes for said data set S[k], said set of traveltimes being suitable for accurately imaging said deep target region; and c) imaging said deep target region by migrating said data set S[k] using said set of traveltimes.

2. The method of claim 1 wherein said traveltimes are first arrival traveltimes.

3. The method of claim 2 wherein said first arrival traveltimes correspond substantially to most energetic arrivals.

4. The method of claim 1 wherein said datum D[k] is situated under said complex velocity structure.

5. The method of claim 4 wherein a calculation of traveltimes for said deep target region and a datum D[0] corresponding to said data set S[0] is subject to an effect selected from headwaves, caustics, and multivaluedness.

6. The method of claim 1 wherein determining said set of traveltimes is performed by applying a solution of the eikonal equation to a subsurface velocity model corresponding to said data set S[k].

7. The method of claim 1 comprising a step of choosing a downward continuation depth step $\Delta z$ such that first arrival traveltimes computed for said depth step correspond substantially to most energetic arrivals.

8. The method of claim 1 comprising a step of choosing a downward continuation depth step $\Delta z$ such that $\Delta z$ is on the order of a seismic wavelength for said data set S[0].

9. The method of claim 1 wherein said said datum D[k] is formed by a substantially planar surface.

10. The method of claim 1 wherein said deep target region is at a depth larger than 1000 m relative to a datum D[0] corresponding to said data set S[0].

11. The method of claim 1 wherein said step of downward continuing said data set S[0] comprises a Kirchhoff downward continuation of said data set S[0].

12. The method of claim 1 wherein said step of migrating said data set S[k] comprises a Kirchhoff migration of said data set S[k].

13. A method of imaging a deep target region, comprising:
   a) establishing a seismic data set S[0], and a subsurface velocity model corresponding to said data set S[0];
   b) determining from said velocity model a first set of traveltimes suitable for datuming said data set S[0] to generate a subsurface data set S[k] corresponding to a generally horizontal subsurface datum D[k]; and
   c) determining from said velocity model a second set of traveltimes suitable for migrating said data set S[k] to generate an image of said deep target region.

14. The method of claim 13 wherein said first set of traveltimes is formed substantially by first arrival traveltimes corresponding substantially to most energetic arrivals.

15. The method of claim 14 wherein said second set of traveltimes is formed substantially by first arrival traveltimes corresponding substantially to most energetic arrivals.

16. A method of imaging a deep target region by semi-recursive Kirchhoff migration of seismic data, comprising:
   a) establishing a seismic data set S[0], and a subsurface velocity model corresponding to said data set S[0];
   b) choosing a set of generally horizontal subsurface datums {D[j]} within said velocity model, j=1 ... J, such that said set {D[j]} divides said velocity model into a set of J+1 depth regions {R[j-1]}, j=1 ... J+1;
   c) generating J subsurface data sets {S[j]}, j=1 ... J, wherein
      a set S[j] corresponds to a subsurface datum D[j], and said set S[j] is generating by a downward continuation of a set S[j-1] to said datum D[j]; and
   d) imaging a deep target region R[k] by migrating a data set S[k], wherein k$\in$ [1,J].

17. The method of claim 16 comprising imaging said set {R[j]} for generating a global image by combining images of said set {R[j]}.

18. The method of claim 16 comprising a step of imaging at least an upper part of said deep target region R[k] by migrating a data set S[k-1], for eliminating a near-field distortion in an image of said deep target region R[k].

19. The method of claim 16 wherein generating said data set S[j] comprises a step of local velocity estimation for a depth region R[j].

20. The method of claim 15 wherein said datum D[j] consists essentially of a velocity interface defined by said velocity model.

21. A method of imaging a deep target region by semi-recursive migration of seismic data, comprising:
   a) generating J subsurface data sets {S[j]}, j=1 ... J, J>1, by downward continuing a data set S[0], wherein each set S[j] is generated by downward continuing a set S[j-1]; and
   b) imaging a deep target region R[k] by migrating a data set S[k], wherein k$\in$ [1,J].

22. The method of claim 21 wherein k=J.

23. A method of imaging a deep target region of a complex structure, comprising:
   a) generating a subsurface data set S[k] by downward continuing a data set S[0] describing said complex structure, said subsurface data set S[k] corresponding to a generally horizontal subsurface datum D[k];
   b) determining a set of first-arrival traveltimes suitable for accurately imaging said deep target region, by applying a finite-difference solution of the eikonal equation to a subsurface velocity model corresponding to said data set S[k]; and
   c) imaging said deep target region by migrating said data set S[k] using said set of traveltimes.

24. A system for imaging a deep target region, comprising:
   a) a datuming means for generating a subsurface data set S[k] by downward continuing a data set S[0], said subsurface data set S[k] corresponding to a generally horizontal subsurface datum D[k];
   b) a traveltime determination means for determining a set of traveltimes for said data set S[k], said set of traveltimes being suitable for accurately imaging said deep target region; and
   c) an imaging means for imaging said deep target region by migrating said data set S[k] using said set of traveltimes.

25. The method of claim 1 wherein said subsurface datum D[k] is formed by a two-dimensional surface.

26. A method of imaging a deep target region situated under a complex velocity structure, comprising:
   a) establishing a surface data set corresponding to the earth's surface;
   b) downward continuing said surface data set to a first generally horizontal subsurface datum situated under said complex velocity structure, to generate a first subsurface data set corresponding to said subsurface datum, for mitigating an effect of said complex velocity structure on a processing of said surface data set;
   c) employing a velocity model of said complex velocity structure to compute a set of traveltimes for said subsurface datum; and
   d) imaging said deep target region by migrating said subsurface data set using said set of traveltimes.

* * * * *